(12) United States Patent
Liao et al.

(10) Patent No.: US 11,113,165 B2
(45) Date of Patent: Sep. 7, 2021

(54) METHOD FOR DETECTING REPAIR-NECESSARY MOTHERBOARDS AND DEVICE USING THE METHOD

(71) Applicant: HONGFUJIN PRECISION ELECTRONICS (TIANJIN) CO., LTD., Tianjin (CN)

(72) Inventors: Ming-Kuei Liao, Singapore (SG); Shao-Ping Mu, Tianjin (CN); Hong-Bo Wang, Tianjin (CN)

(73) Assignee: HONGFUJIN PRECISION ELECTRONICS (TIANJIN) CO., LTD., Tianjin (CN)

( * ) Notice: Subject to any disclaimer, the term of this patent is extended or adjusted under 35 U.S.C. 154(b) by 158 days.

(21) Appl. No.: 16/389,465

(22) Filed: Apr. 19, 2019

(65) Prior Publication Data

US 2020/0241986 A1 Jul. 30, 2020

(30) Foreign Application Priority Data

Jan. 30, 2019 (CN) .......................... 201910094308.X

(51) Int. Cl.
*G06F 11/00* (2006.01)
*G06F 11/22* (2006.01)
*G06N 20/00* (2019.01)

(52) U.S. Cl.
CPC ......... *G06F 11/2257* (2013.01); *G06N 20/00* (2019.01)

(58) Field of Classification Search
CPC .. G06F 11/22; G06F 11/2205; G06F 11/2257; G06F 11/2263; G06F 11/2268; G06F 11/2284; G06N 20/00
See application file for complete search history.

(56) References Cited

U.S. PATENT DOCUMENTS

| | | | |
|---|---|---|---|
| 5,919,267 A * | 7/1999 | Urnes | G06F 11/0736 714/26 |
| 9,954,727 B2 * | 4/2018 | Su | H04L 41/0686 |
| 2005/0257095 A1 * | 11/2005 | Rapaich | G06F 11/2284 714/42 |
| 2007/0174705 A1 * | 7/2007 | Shih | G06F 11/2284 714/36 |

(Continued)

FOREIGN PATENT DOCUMENTS

| | | |
|---|---|---|
| CN | 109214446 | 1/2019 |
| JP | 6193428 | 9/2017 |

(Continued)

*Primary Examiner* — Michael Maskulinski
(74) *Attorney, Agent, or Firm* — ScienBiziP, P.C.

(57) ABSTRACT

A method for detecting repairable boards requiring repair amongst many boards which may or may not require repair applies a board detection model based on training features of many sample repairable boards. The method obtains repair-relevant information of all the sample repairable boards, extracts predetermined features from the repair-relevant information, and analyzes the predetermined features to obtain the training features. The board detection model is established and trained based on the training features, and receives repair-relevant information of each repairable board to obtain a result of detection repairable board according to the board detection model. A device for detecting repairable boards is also provided.

16 Claims, 3 Drawing Sheets

(56) References Cited

U.S. PATENT DOCUMENTS

| | | | |
|---|---|---|---|
| 2011/0055631 A1* | 3/2011 | Chin | G06F 11/2284 |
| | | | 714/26 |
| 2011/0161737 A1* | 6/2011 | Kong | G06F 11/2284 |
| | | | 714/36 |
| 2017/0161182 A1 | 6/2017 | Yoshida et al. | |
| 2018/0293501 A1* | 10/2018 | Ambati | G06N 20/00 |

FOREIGN PATENT DOCUMENTS

| | | |
|---|---|---|
| TW | 201333484 | 8/2013 |
| TW | I571736 | 2/2017 |
| WO | 2015025472 | 2/2015 |
| WO | 2018183473 | 10/2018 |

* cited by examiner

METHOD FOR DETECTING REPAIR-NECESSARY MOTHERBOARDS AND DEVICE USING THE METHOD

FIELD

The subject matter herein generally relates to testing motherboards.

BACKGROUND

When a device is failed, a customer may return a motherboard to an equipment manufacturer for repair if the motherboard appears to have a fault. Taking server motherboards as an example, not all of returned motherboards need to be repaired. The current practice is to test all returned motherboards to identify boards that do need to be repaired. However, there are many motherboards that were returned required no repairs, therefore testing them all is a loss of manpower time, cost of freight, etc.

Thus, there is a room for improvement.

BRIEF DESCRIPTION OF THE DRAWINGS

Implementations of the present technology will now be described, by way of example only, with reference to the attached figures.

DETAILED DESCRIPTION

Figure 1:
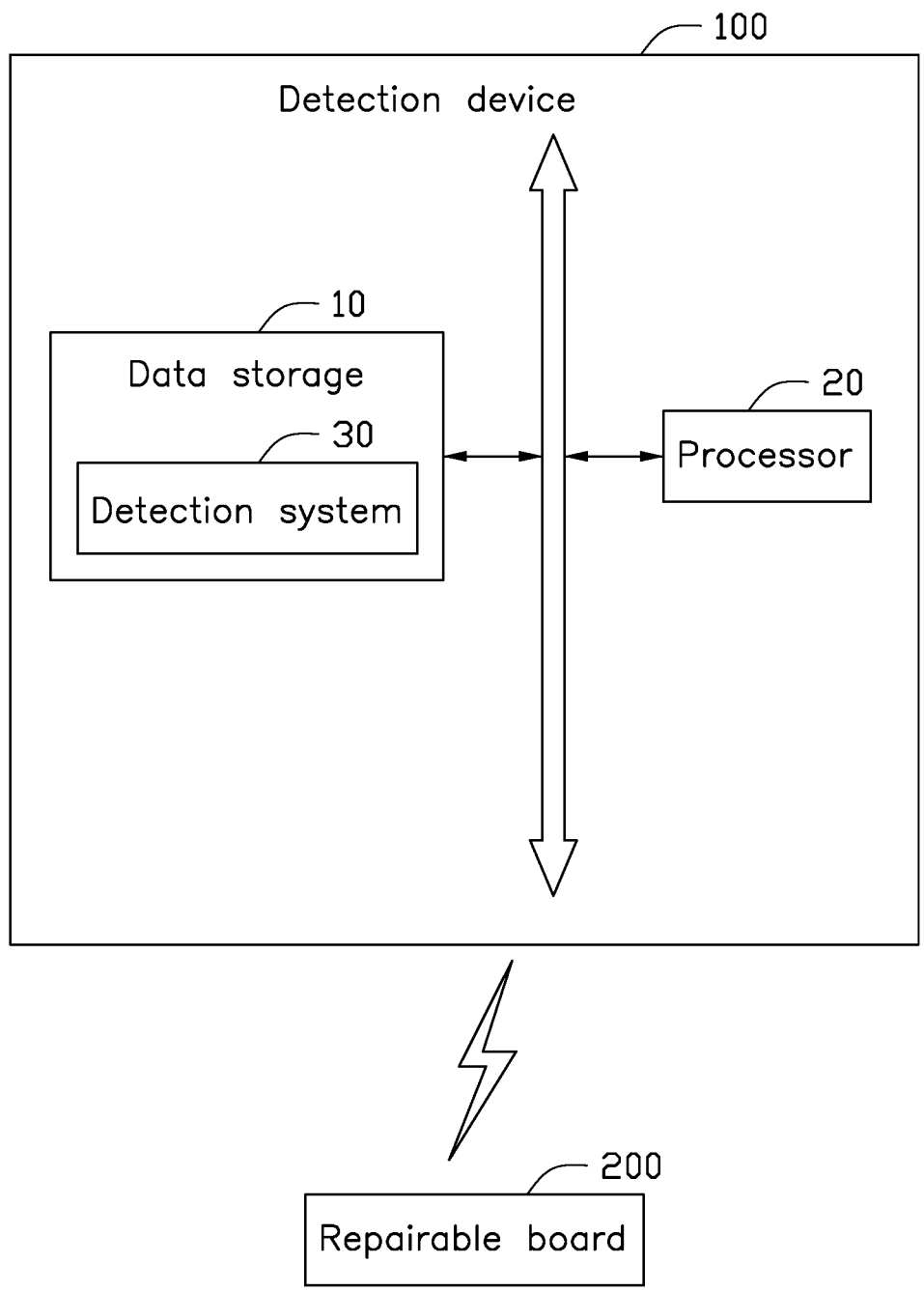
FIG. 1 is a block diagram of an embodiment of a device for detecting repairable board.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates a detection device 100 for detecting repairable boards in accordance with an embodiment. The detection device 100 can communicate in a wired or wireless manner with one or more repairable boards 200. The repairable board 200 can be a main-board or a function boards of a communication device.

The detection device 100 can comprise at least one data storage 10, at least one processor 20, and a detection system 30. The detection system 30 is configured to detect boards which require repairs.

In one embodiment, the detection device 100 can be a computer, a notebook, or a server. The detection device 100 can further comprise an input/output device, a network access device, and communication buses.

Figure 2:
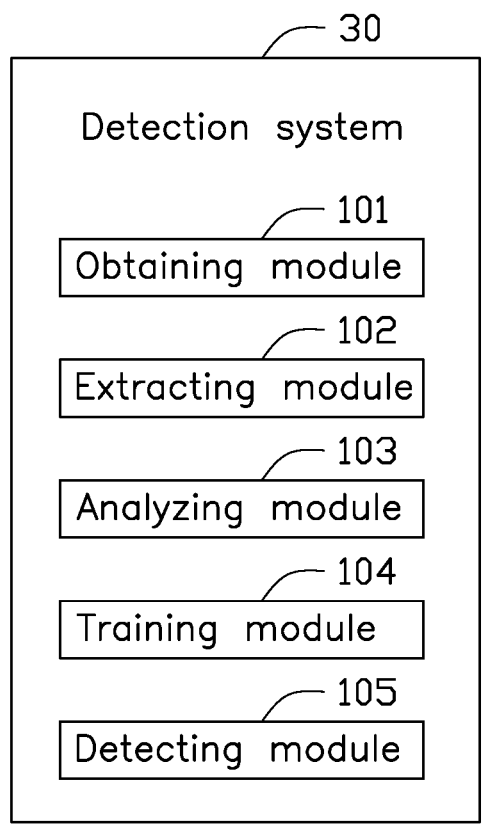
FIG. 2 is a block diagram of an embodiment of a system for detecting applied by the device of FIG. 1.

FIG. 2 illustrates the detection system 30 comprising a plurality of modules, such as an obtaining module 101, an extracting module 102, an analyzing module 103, a training module 104, and a detecting module 105. The modules 101-105 may comprise one or more software programs in the form of computerized codes stored in the data storage 10. The computerized codes may include instructions that can be executed by the processor 20 to provide functions for the modules 101-105.

In one embodiment, the data storage 10 can be in the detection device 100, or can be a separate external memory card, such as an SM card (Smart Media Card), an SD card (Secure Digital Card), or the like. The data storage 10 can include various types of non-transitory computer-readable storage mediums. For example, the data storage 10 can be an internal storage system, such as a flash memory, a random access memory (RAM) for temporary storage of information, and/or a read-only memory (ROM) for permanent storage of information. The data storage 10 can also be an external storage system, such as a hard disk, a storage card, or a data storage medium. The processor 20 can be a central processing unit (CPU), a microprocessor, or other data processor chip that performs functions of the detection device 100.

The obtaining module 101 can obtain information relevant to repair of a plurality of sample repairable boards 200.

In one embodiment, a sample database can be pre-established, the sample database can store repair-relevant information of the plurality of the sample repairable boards 200. Detection is carried out on each sample repairable board 200 and result is stored. The sample repairable boards 200 comprise boards not requiring repair (normal boards) and boards requiring repair (abnormal boards). While the normal boards require no repair, the abnormal boards require repairs.

The obtaining module 101 can communicate with the sample database to obtain the repair-relevant information of the plurality of the sample repairable boards 200, and the plurality of the sample repairable boards 200 comprise some normal boards and some abnormal boards.

In one embodiment, the repair-relevant information of each repairable board 200 can be store in a baseboard management controller (BMC) of each repairable board 200.

The extracting module 102 can extract predetermined features from the repair-relevant information of the plurality of the sample repairable boards 200.

In one embodiment, the repair-relevant information of the sample repairable boards 200 may comprise data of the sample repairable boards 200. However, when a board detection model is trained, not all the repair-relevant information is provided to train the board detection model. Then, the extracting module 102 may extract predetermined features from the repair-relevant information of the sample repairable boards 200.

In one embodiment, the predetermined features can be selected from the group comprising of agent identification (ID), category, severity, timestamp, message (status message), message ID, fully qualified device descriptor (FQDD), argument (ARG), and raw event data.

In one embodiment, the extracting module 102 can extract the predetermined features from the repair-relevant information of each sample repairable board 200. The predetermined features of each sample repairable board 200 may be different or one type of feature may show different contents.

The analyzing module 103 can analyze the predetermined features of each sample repairable board 200 to obtain one or more training features.

In one embodiment, the analyzing module 103 can analyze and convert the predetermined features of each sample repairable board 200 to obtain one or more training features. The training features can be used to train the board detection model. The analyzing module 103 can analyze the predetermined features of each sample repairable board 200 through a method of the analyzing module 103 obtaining a features list which comprises the predetermined features, encoding a value of each feature of the features list, and converting feature values of the predetermined features to truth-values based on a predetermined converting rule. Thereby, a features truth-value list is established and the analyzing module 103 can further apply the features truth-value list and the result of detection of the sample repairable board 200 as the training feature.

In one embodiment, the features list can comprise values of all feature that may appear in the predetermined features information. The values of features of the predetermined features can be part or all of the values of features in the feature list.

In one embodiment, the predetermined converting rule can comprise the analyzing module 103 converting the feature values of the features list to a truth-value of "1" when a value of feature in the features list does exist in the predetermined features. When a value of feature of the features list does not exist in the predetermined features, the analyzing module 103 will convert the feature value of the features list to a truth-value of "0".

For example, the obtaining module 101 obtains the repair-relevant information of three hundred sample repairable boards 200, the serial number of the sample repairable boards 200 being PPID1, PPID2, PPID3, . . . , PPID300. The predetermined features information is the status message of each sample repairable board 200, and the features list corresponding to the status message comprises four thousand kinds of feature values (INFO1, INFO2, INFO3, INFO4, . . . , INFO4000). Each feature value represents to a type of status message. The status message of a first sample repairable board PPID1 comprises feature values of INFO1, INFO4, INFO5, . . . , INFO4000 and the first sample repairable board PPID1 is a normal repairable board, for example. The status message of a second sample repairable board PPID2 comprises feature values of INFO2, INFO4, INFO5, . . . , INFO4000 and the second sample repairable board PPID2 is an abnormal repairable board, for example. The status message of a third sample repairable board PPID3 comprises feature values of INFO2, INFO3, . . . , INFO4000 and the third sample repairable board PPID3 is an abnormal repairable board, for example. The status message of a fourth sample repairable board PPID4 comprises feature values of INFO2, INFO3, INFO4, . . . , INFO4000 and the fourth sample repairable board PPID4 is a normal repairable board, for example. The status message of a three hundredth sample repairable board PPID300 comprises feature values of INFO1, INFO3, INFO5, . . . , INFO4000 and the three hundredth sample repairable board PPID300 is an abnormal repairable board, for example.

The analyzing module 103 determines whether a feature value of the features list appears in the status information of each repairable board 200. If the feature value of the features list does appear in the status information, the analyzing module 103 converts the feature value of the features list to the truth-value of "1". If the feature value of the features list does not appear in the status information, the analyzing module 103 converts the feature value of the features list to the truth-value of "0". The analyzing module 103 can thus obtain the features truth-value list of the sample repairable boards 200.

| | Features truth-value list | | | | | | |
|---|---|---|---|---|---|---|---|
| Serial Number | 1<br>INFO1 | 2<br>INFO2 | 3<br>INFO3 | 4<br>INFO4 | 5<br>INFO5 | . . .<br>. . . | 4000<br>INFO4000 |
| PPID1 | 1 | 0 | 0 | 1 | 1 | . . . | 1 |
| PPID2 | 0 | 1 | 0 | 1 | 1 | . . . | 1 |
| PPID3 | 0 | 1 | 1 | 0 | 0 | . . . | 1 |
| PPID4 | 0 | 1 | 1 | 1 | 0 | . . . | 1 |
| . . . | . . . | . . . | . . . | . . . | . . . | . . . | . . . |
| PPID300 | 1 | 0 | 1 | 0 | 1 | . . . | 1 |

In one embodiment, the features truth-value list can further add a column to record the result of detection of each sample repairable board 200. Then, the features truth-value list can be shown as below:

| | Features truth-value list | | | | | | | |
|---|---|---|---|---|---|---|---|---|
| Serial Number | 1<br>INFO1 | 2<br>INFO2 | 3<br>INFO3 | 4<br>INFO4 | 5<br>INFO5 | . . .<br>. . . | 4000<br>INFO4000 | Detection Result |
| PPID1 | 1 | 0 | 0 | 1 | 1 | . . . | 1 | Y |
| PPID2 | 0 | 1 | 0 | 1 | 1 | . . . | 1 | N |
| PPID3 | 0 | 1 | 1 | 0 | 0 | . . . | 1 | N |

-continued

Features truth-value list

| Serial Number | 1 INFO1 | 2 INFO2 | 3 INFO3 | 4 INFO4 | 5 INFO5 | ... ... | 4000 INFO4000 | Detection Result |
|---|---|---|---|---|---|---|---|---|
| PPID4 | 0 | 1 | 1 | 1 | 0 | ... | 1 | Y |
| ... | ... | ... | ... | ... | ... | ... | ... | ... |
| PPID300 | 1 | 0 | 1 | 0 | 1 | ... | 1 | N |

In the features truth-value list, "Y" represents normal repairable board and "N" represents abnormal repairable board.

In one embodiment, when the predetermined features is the message ID or other information selected from the group, the features truth-value list can also be obtained according to the above described method.

The training module 104 can establish and train the board detection model based on the training features.

In one embodiment, the board detection model can be obtained by a machine learning model and multiple training features. For example, the training module 104 firstly establishes the machine learning model, the machine learning model can comprise an input layer, a plurality of hidden layers, and an output layer. The training module 104 further trains the machine learning model based on the multiple training features to obtain the board detection model. The input layer of the machine learning model can be configured to receive the multiple training features and each hidden layer comprises multiple nodes (neurons of neural network). When the training module 104 trains the machine learning model based on the multiple training features, the training module 104 adjusts a weight value of each hidden layer through a back propagation (BP) algorithm. The output layer of the machine learning model can be configured to receive output signal of the last hidden layer.

In one embodiment, the training module 104 establishes and trains the board detection model based on the training features through the method of the training module 104 by dividing the training features into a training set and a verifying set, for example, eighty percent of the training features being the training set and twenty percent of the training features being the verifying set. The training module 104 establishes the machine learning model and trains the machine learning model based on the training set. The training module 104 applies the verifying set to verify a trained machine learning model and count a prediction accuracy of the trained machine learning model based on each verification result, and the training module 104 determines whether the prediction accuracy of the trained machine learning model is less than a predetermined value. The training module 104 further sets the trained machine learning model as the board detection model when the prediction accuracy of the trained machine learning model is not less than the predetermined value.

In one embodiment, when the prediction accuracy of the trained machine learning model is less than the predetermined value, the training module 104 adjusts parameters of the machine learning model, and retrains an adjusted machine learning model based on the training set. If a prediction accuracy of the adjusted machine learning model is greater than the predetermined value, the training module 104 sets the adjusted machine learning model as the board detection model. Otherwise, the training module 104 repeats the adjustment and retraining of the parameters of the machine learning model according to the above steps until the prediction accuracy is greater than the predetermined value.

In one embodiment, the parameters of the machine learning model can comprise a total number of layers of the machine learning model and the number of neurons of each layer of the machine learning model. When the training module 104 adjusts the parameters of the machine learning model, the training module 104 can adjust the total number of layers of the machine learning model or the number of neurons of each layer of the machine learning model.

In one embodiment, when the training module 104 adjusts the parameters of the machine learning model, the training module 104 also can adjust the total number of layers and the number of neurons of each layer of the machine learning model.

In one embodiment, when the training module 104 applies the verifying set to verify the trained machine learning model, the training module 104 can obtain multiple verification results. Then the training module 104 can count the prediction accuracy of the trained machine learning model based on the multiple verification results. When the prediction accuracy is at least equal to the predetermined value, it indicates that the trained machine learning model matches the model requirement, and the training module 104 can set the trained machine learning model as the board detection model. When the prediction accuracy is less than the predetermined value, it indicates that the machine learning model needs to be improved, and the training module 104 can adjust the parameters of the machine learning model and retrain the adjusted machine learning model based on the training set. The training module 104 further applies the verifying set to verify the adjusted machine learning model and regain a prediction accuracy of the adjusted machine learning model based on each verification result. When the prediction accuracy of the adjusted machine learning model is at least equal to the predetermined value, the training module 104 sets the adjusted machine learning model as the board detection model. When the prediction accuracy of the adjusted machine learning model is less than the predetermined value, the training module 104 repeats the above steps until the prediction accuracy is greater than the predetermined value.

In one embodiment, the predetermined value can be set according to a actual demand. For example, the predetermined value can be set as ninety percent. When the prediction accuracy of the trained machine learning model is greater than ninety percent, the training module 104 sets the trained machine learning model as the board detection model.

The detecting module 105 can receive repair-relevant information of a specified repairable board 200 and transmit the repair-relevant information to the board detection model to obtain a detection result of the specified repairable board 200.

In one embodiment, the specified repairable board 200 can be a repairable board not yet detected or analyzed. When the repair-relevant information of the specified repairable board 200 is inputted into the board detection model, the board detection model can output the detection result of the specified repairable board 200. The detection result can show that the specified repairable board 200 is a normal repairable board or an abnormal board.

In one embodiment, the detecting module 105 receives the repair-relevant information of the specified repairable board 200 to calculate a probability or being a normal board through the board detection model. The detecting module 105 determines whether the value of the probability is greater than a predetermined value, and obtains the detection result of the specified repairable board based on a determined result.

For example, the predetermined value of probability is set as ninety-five percent. When the probability value is greater than ninety-five percent, the detecting module 105 determines that the specified repairable board 200 is a normal repairable board. When the probability value is less than ninety-five percent, the detecting module 105 determines that the specified repairable board 200 is an abnormal repairable board.

In one embodiment, the detecting module 105 further can receive the repair-relevant information of the specified repairable board 200 to calculate probability of the board 200 being an abnormal board, through the board detection model.

In one embodiment, when the training module 104 trains the machine learning model based on the training features, the training module 104 can obtain a weighted value of each feature value of the features truth-value list. The detecting module 105 can calculate the result of detection of the specified repairable board according to a predetermined model algorithm and the weighted value of each feature value.

Figure 3:
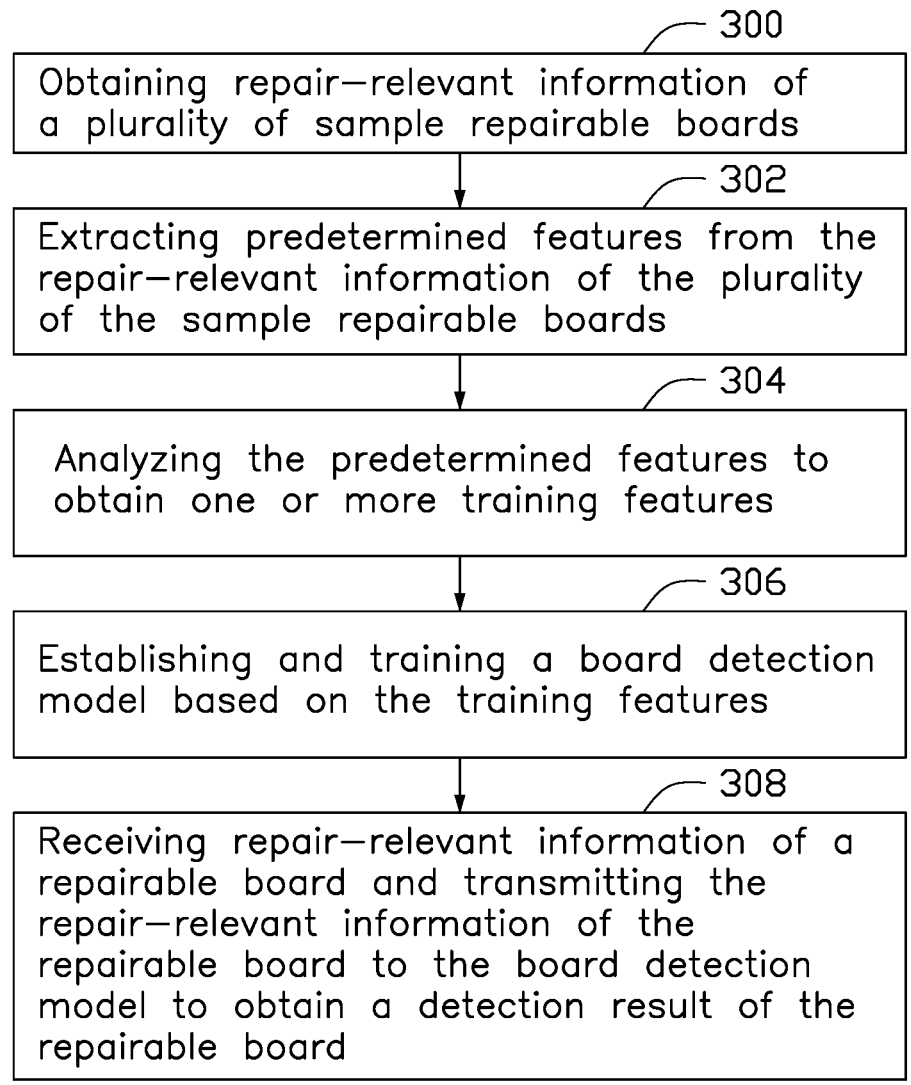
FIG. 3 is a flow diagram of an exemplary embodiment of a method for detecting repairable board.

FIG. 3 illustrates one exemplary embodiment of a method for detecting repairable boards 200. The flowchart presents an exemplary embodiment of the method. The exemplary method is provided by way of example, as there are a variety of ways to carry out the method. The method described below can be carried out using the configurations illustrated in FIG. 2, for example, and various elements of these figures are referenced in explaining the example method. Each block shown in FIG. 3 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can begin at block 300.

In block 300, the obtaining module 101 obtains repair-relevant information of the plurality of sample repairable boards 200.

In block 302, the extracting module 102 extracts predetermined features from the repair-relevant information of the plurality of the sample repairable boards 200.

In block 304, the analyzing module 103 analyzes the predetermined features to obtain one or more training features.

In block 306, the training module 104 establishes and trains a board detection model based on the training features.

In block 308, the detecting module 105 receives repair-relevant information of a specified repairable board 200 and transmits the repair-relevant information of the specified repairable board 200 to the board detection model to obtain a detection result of the specified repairable board 200.

The embodiments shown and described above are only examples. Many details known in the field are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method of implementing repairable board test of a repairable board detection device, the method comprising:
    obtaining, by the repairable board detection device, repair-relevant information of a plurality of sample repairable boards;
    extracting, by the repairable board detection device, predetermined features from the repair-relevant information of the plurality of the sample repairable boards;
    obtaining, by the repairable board detection device, a features list which comprises the predetermined features;
    encoding a value of each feature of the features list and converting feature values of the predetermined features to truth-values based on a predetermined converting rule to establish a features truth-value list, by the repairable board detection device;
    applying, by the repairable board detection device, the features truth-value list and detection results of the plurality of the sample repairable boards as training features;
    establishing and training, by the repairable board detection device, a board detection model based on the training features; and
    receiving, by the repairable board detection device, repair-relevant information of a repairable board and transmitting, by the repairable board detection device, the repair-relevant information of the repairable board to the board detection model to obtain a detection result of the repairable board;
    wherein each feature value is trained to obtain a weighted value, and the board detection model calculates the detection result of the repairable board according to the weighted value of each feature value; and
    wherein the predetermined features are selected from the group consisting of agent identification (ID), category, severity, timestamp, message, message ID, fully qualified device descriptor (FQDD), argument (ARG), and raw event data.

2. The method of claim 1, wherein obtaining the repair-relevant information of the plurality of sample repairable boards comprises:
    obtaining the repair-relevant information of the plurality of the sample repairable boards from a baseboard management controller (BMC) of each sample repairable board.

3. The method of claim 1, wherein establishing and training the board detection model based on the training features comprises:
    establishing a machine learning model and training the machine learning model based on the training features to obtain the board detection model.

4. The method of claim 3, wherein the predetermined converting rule comprises:
    converting a feature value of the features list to a truth-value of "1" in response to the feature value of the features list existing in the predetermined features; and
    converting the feature value of the features list to a truth-value of "0" in response to the feature value of the features list not existing in the predetermined features.

5. The method of claim 1, wherein establishing and training the board detection model based on the training features comprises:
    dividing the training features into a training set and a verifying set;
    establishing a machine learning model and training the machine learning model according to the training set, wherein the machine learning model comprises an input layer, a plurality of hidden layers, and an output layer;
    applying the verifying set to verify a trained machine learning model and counting a prediction accuracy of the trained machine learning model based on each verification result;
    determining whether the prediction accuracy of the trained machine learning model is less than a predetermined value; and
    setting the trained machine learning model as the board detection model in response to the prediction accuracy of the trained machine learning model being not less than the predetermined value.

6. The method of claim 5, further comprising:
    adjusting parameters of the machine learning model in response to the prediction accuracy being less than the predetermined value;
    retraining an adjusted machine learning model according to the training set;
    applying the verifying set to verify the adjusted machine learning model and regaining a prediction accuracy of the adjusted machine learning model based on each verification result;
    determining whether the prediction accuracy of the adjusted machine learning model is less than the predetermined value;
    setting the adjusted machine learning model as the board detection model in response to the prediction accuracy of the adjusted machine learning model being not less than the predetermined value; and
    repeating adjustment and retraining steps until the prediction accuracy is not less than the predetermined value in response to the prediction accuracy of the adjusted machine learning model being less than the predetermined value.

7. The method of claim 1, wherein receiving the repair-relevant information of the repairable board and transmitting the repair-relevant information of the repairable board to the board detection model to obtain the detection result of the repairable board comprises:
    receiving the repair-relevant information of the repairable board and transmitting the repair-relevant information of the repairable board to the board detection model to obtain a probability value being a normal board or a probability value being an abnormal board;
    determining whether the probability value is greater than a predetermined probability; and
    obtaining the detection result of the repairable board based on a determined result.

8. A repairable board detection device comprising:
    at least one processor;
    a storage; and
    one or more programs that are stored in the storage and executed by the at least one processor, the one or more programs comprising instructions for:
        obtaining repair-relevant information of a plurality of sample repairable boards;
        extracting predetermined features from the repair-relevant information of the plurality of the sample repairable boards;
        analyzing the predetermined features to obtain one or more training features;
        establishing and training a board detection model based on the training features; and
        receiving repair-relevant information of a repairable board and transmitting the repair-relevant information of the repairable board to the board detection model to obtain a detection result of the repairable board;
        wherein the predetermined features are selected from the group consisting of agent ID, category, severity, timestamp, message, message ID, FQDD, ARG, and raw event data.

9. The repairable board detection device of claim 8, wherein the instruction of obtaining the repair-relevant information of the plurality of sample repairable boards comprises:
    obtaining the repair-relevant information of the plurality of the sample repairable boards from a BMC of each sample repairable board.

10. The repairable board detection device of claim 8, wherein the instruction of analyzing the predetermined features to obtain the one or more training features comprises:
    obtaining a features list which comprises the predetermined features;
    encoding a value of each feature of the features list and converting feature values of the predetermined features to truth-values based on a predetermined converting rule to establish a features truth-value list; and
    applying the features truth-value list and detection results of the plurality of the sample repairable boards as the training features.

11. The repairable board detection device of claim 10, wherein the instruction of establishing and training the board detection model based on the training features comprises:
    establishing a machine learning model and training the machine learning model based on the training features to obtain the board detection model.

12. The repairable board detection device of claim 11, wherein each feature value is trained to obtain a weighted value, and the board detection model calculates the detection result of the repairable board according to the weighted value of each feature value.

13. The repairable board detection device of claim 11, wherein the predetermined converting rule comprises:
    converting a feature value of the features list to a truth-value of "1" in response to the feature value of the features list existing in the predetermined features; and
    converting the feature value of the features list to a truth-value of "0" in response to the feature value of the features list not existing in the predetermined features.

14. The repairable board detection device of claim 8, wherein the instruction of establishing and training the board detection model based on the training features comprises:

dividing the training features into a training set and a verifying set;
establishing a machine learning model and training the machine learning model according to the training set, wherein the machine learning model comprises an input layer, a plurality of hidden layers, and an output layer;
applying the verifying set to verify a trained machine learning model and counting a prediction accuracy of the trained machine learning model based on each verification result;
determining whether the prediction accuracy of the trained machine learning model is less than a predetermined value; and
setting the trained machine learning model as the board detection model in response to the prediction accuracy of the trained machine learning model being not less than the predetermined value.

15. The repairable board detection device of claim 14, wherein the one or more programs further comprise:
adjusting parameters of the machine learning model in response to the prediction accuracy being less than the predetermined value;
retraining an adjusted machine learning model according to the training set;
applying the verifying set to verify the adjusted machine learning model and regaining a prediction accuracy of the adjusted machine learning model based on each verification result;
determining whether the prediction accuracy of the adjusted machine learning model is less than the predetermined value;
setting the adjusted machine learning model as the board detection model in response to the prediction accuracy of the adjusted machine learning model being not less than the predetermined value; and
repeating adjustment and retraining steps until the prediction accuracy is not less than the predetermined value in response to the prediction accuracy of the adjusted machine learning model being less than the predetermined value.

16. The repairable board detection device of claim 8, wherein the instruction of receiving the repair-relevant information of the repairable board and transmitting the repair-relevant information of the repairable board to the board detection model to obtain the detection result of the repairable board comprises:
receiving the repair-relevant information of the repairable board and transmitting the repair-relevant information of the repairable board to the board detection model to obtain a probability value being a normal board or a probability value being an abnormal board;
determining whether the probability value is greater than a predetermined probability; and
obtaining the detection result of the repairable board based on a determined result.

* * * * *